ated Feb. 19, 1957

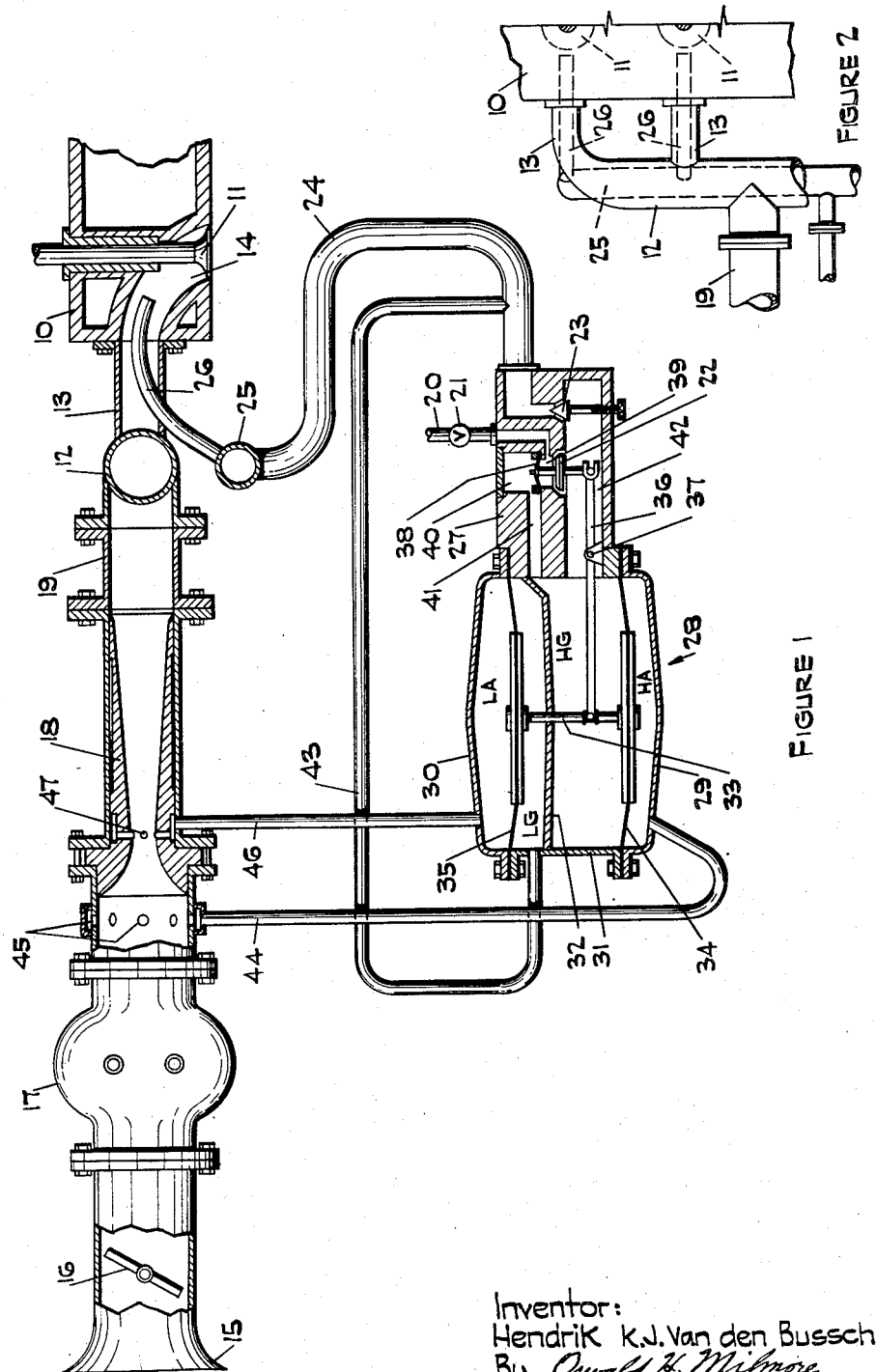

United States Patent Office

2,781,752

CHARGE-FORMING APPARATUS FOR GAS INTERNAL COMBUSTION ENGINES

Hendrik K. J. van den Bussche, Delft, Netherlands, assignor to Shell Development Company, Emeryville, Calif., a corporation of Delaware Application June 16, 1953, Serial No. 362,102

4 Claims. (Cl. 123—120)

The invention relates to gas-fuel internal combustion engines and is, more particularly, concerned with a device for supplying air and gas thereto in regulated amounts and mixing air and gas to form a charging mixture. The apparatus according to the instant invention includes an air duct provided with an air flow controller through which air may be aspirated or which may include a compressor such as a mechanical supercharger or an exhaust turbosupercharger, and a gas conduit connected to a source of gas under pressure, such as pressurized reservoir or pipe or the dicharge of a compressor supplied with low pressure fuel gas or the discharge of a vaporizer wherein volatile, liquid fuel is vaporized, for supplying fuel gas to the air duct to form a combustible mixture that is fed to the engine cylinder through the intake valve thereof, the gas conduit having a gas metering valve whereby the rate of flow of fuel gas is regulated to bear a desired relation to the rate of air flow.

Internal combustion engines running on gaseous fuel, such as light normally gaseous hydrocarbons or volatile liquid hydrocarbons that are vaporized by a suitable heater such as one utilizing the hot engine exhaust, often have fuel systems that include one or more pressure controllers connected in series for regulating the pressure of the gas to a constant pressure about the same as that of the air, e. g., zero gauge pressure, and the gas is aspirated or inducted into the intake manifold by the suction of the engine; such an arrangement is necessary to avoid the danger of loss of fuel gas and the formation of an explosive fuel-air mixture in the air duct by discharge of fuel gas, e. g., when for any reason the engine suction is insufficient to induct all of the gas released. In such systems it is difficult to regulate the mixture strength when the rate of gas flow varies in response to changes in load, e. g., by a manually-controlled or governor-controlled throttle. Various mechanical and pneumatic contrivances have been employed for enhancing the rate of gas flow at increased loads or rates of air flow without, however, achieving equality between the pressures in the air and fuel supply ducts upstream of their juncture point; this made precise control of the fuel-air ratio difficult and presented the danger of diffusion or flow of the fluid supplied at the higher pressure upstream from the juncture point into the duct wherein the lower pressure prevailed. Such a condition is dangerous since it can cause an explosion in the event of an engine blow-back. Prior attempts to insure proportional flow rates of air and gas by synchronously driven compressors, flow controllers, or the like, have been subject to the drawback that the pressures in the air and gas ducts were not equal over any wide range of flow rates, thereby presenting above-noted hazard of diffusion or flow of one fluid into the supply duct of the other with the formation of an explosive mixture; such arrangements were, moreover, complicated and difficult to adjust.

It is an object of this invention to provide an improved charge-forming apparatus capable of maintaining the weight ratio of air and fuel gas in the gas-air mixture supplied to the engine at a substantially constant and, if desired, adjustable value, over a wide range of fuel flow rates. This means that if the correct gas-air ratio is established for a specific engine load and operating conditions, this ratio will be maintained substantially throughout all other engine loads.

A specific object is to provide a proportioning system for gas-fuel internal combustion engines wherein the ratio of fuel gas to air is maintained by a gas metering valve inserted in the gas supply conduit and actuated automatically by an actuator that includes a plurality of movable, pressure-responsive walls such as diaphragms that are subjected to differential pressures generated in accordance with the rates of air flow and fuel gas flow.

Ancillary objects are to provide a gas metering valve and actuator combination that has certain safety features whereby damage to the main diaphragms of the actuator is prevented in the event of failure of a small diaphragm associated with the metering valve; to provide an oil-pressure controlled shut-off valve in the gas supply system for preventing the admission of gas to the air duct when starting the engine after a shut-down until the duct has been purged from such gas as may have leaked into the air duct; and to arrange the air duct and gas conduit so that the pressures acting on opposite sides of the same diaphragms in the actuator are substantially equal, whereby the diaphragms are subjected to reduced stresses.

A further object is to provide an improved charge-forming system of the type described wherein the pressures of the air and fuel gas at the junction point at which those fluids are brought together are kept equal, whereby the danger of backflow or diffusion of one or the other of them through the duct supplying the other and the formation of a hazardous mixture are obviated. Ancillary thereto, it is an object to provide an improved apparatus wherein the gas metering valve is effective to bring the pressure of the fuel gas in the gas supply duct to a pressure that is equal to that of the air in the air supply duct.

Still a further object is to provide an improved charge-forming system wherein the said junction point between the fuel gas and air ducts is in close proximity to the intake valve of the engine, whereby only a limited, inconsequential quantity of the combustible gas mixture is present in the system outside of the engine cylinder. Ancillary thereto, it is an object to provide a fuel supply system for multi-cylinder engines operated on gaseous fuel having separate air and gas manifolds that are maintained at substantially a common pressure and are provided with ample and unobstructed branches leading to and communicating with each other in close proximity to the respective engine intake valves.

In summary, according to the invention, the improved porportioning control and mixing are achieved by supplying air at atmospheric or other pressure and fuel gas from a source under presure through respective ducts of ample sizes to a junction point so that the pressures of the air and fuel gas are kept substantially equal at corresponding points in the air and gas lines, and controlling the flow of the gas by means of a gas metering valve in the gas line to maintain the flow of gas at a rate that bears a predetermined ratio to the rate of air flow.

The junction point of the air and fuel gas supply streams is advantageously near to the intake valve of the engine, viz., a distance upstream preferably not more than two times the diameter of the air duct leading directly to the intake valve, i. e., of the air branch in the case of a manifolded supply system for multi-cylinder engines.

In the preferred embodiment, the regulation is achieved by automatic actuation of the gas metering valve by an actuator responsive to the rates of air and gas flows. Such an actuator preferably has four separate chambers, each bounded in part by a movable wall, arranged to provide two pairs of surfaces subjected to opposing forces produced respectively by the differential between two air pressures and the differential between two fuel gas pressures, the differentials varying with the flow of air and with the flow of gas, respectively, through the respective ducts. Thus, one pair of chambers may be bounded in part by a first pair of opposed walls such as pistons or diaphragms and connected respectively to axially spaced points in the air duct in the vicinity of a metering restriction therein, e. g., one point may be upstream from a Venturi constriction and the other at the throat, or one may be upstream from a metering orifice plate or metering nozzle plate and the other immediately downstream or somewhat farther downstream from the plate; the other pair of chambers, bounded in part by similar walls, may be connected respectively to axially spaced points in the gas conduit in the vicinity of a metering restriction therein, e. g., as described for the air duct. One of the metering restrictions, e. g., that in the gas conduit, may be adjustable, as by providing a needle valve, whereby the flow rate corresponding to a given differential pressure can be varied, for adjusting the mixture strength. The metering restrictions in the air and gas ducts should have similar characteristics, as explained hereinafter. A first differential pressure proportional to the rate of air flow is thereby generated in the first two chambers, and a second differential pressure proportional to the rate of gas flow is thereby generated in the second chamber, the connections being such that these differential pressures oppose each other, and the movable walls being connected to the gas metering valve so as to open the valve upon a rise in the first differential and a drop in the second differential. By providing air and gas ducts of ample sizes pressures at corresponding points in the air and gas lines only negligibly small pressure drops occur and the pressures at corresponding points in the two ducts are substantially equal, whereby the lower of said air pressures acting on said walls is also substantially equal to the lower of said gas pressures acting on said walls.

Regulating devices using differential pressures are already known in liquid fuel carburetting systems; see, for example, British Patent No. 587,093. In such regulating devices the pressures of liquid fuel and air, which are allowed to act on the diaphragms, are the pressures prevailing ahead of and inside or behind a constriction provided in both the supply lines for liquid fuel and air. The pressures of the liquid fuel and the air are not kept equal at corresponding points in the air and fuel lines.

By "corresponding points in the gas and air lines," as used herein, should be understood those points which lie on the same side of the points at which the rate of flow are measured, e. g., the constrictions provided in each line, in respect of the direction of flow of the medium passing through the line concerned.

The invention will be further described with reference to the accompanying drawings forming a part of this specification and showing one preferred embodiment thereof by way of illustration; wherein:

Figure 1 is a diagrammatic side elevation view of the apparatus, parts being shown in section and the air duct is shown extending away from the engine merely for clarity;

Figure 2 is a fragmentary plan view of the manifolds and branches near the intake valve;

Figure 3:
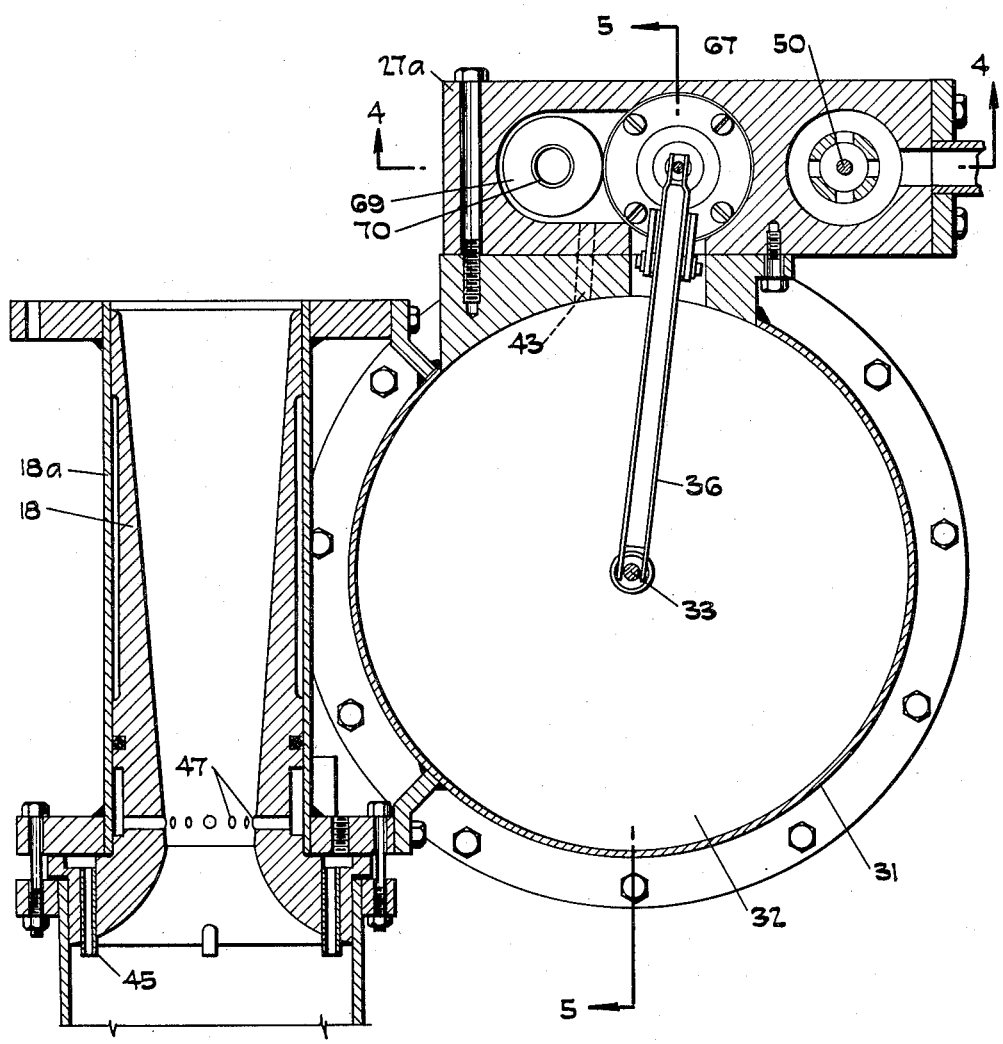
Figure 3 is a section view of the regulator and parts of the air duct taken on a horizontal section plane indicated at 3—3 in Figure 4.

Referring to the drawings in detail, and particularly to Figures 1 and 2, a part of a multi-cylinder internal combustion gas engine is shown at 10, having intake valves 11 connected to a common air manifold 12 by air branches 13 that extend from the manifold respectively to the intake valves, the passage 14 within the water-jacketed part of the engine being for purposes of this specification regarded as part of the air branch. The manifold is supplied with air by an air duct having an air inlet section 15, a flow controller that may include either an air throttle 16 or a supercharger 17 (driven by any suitable means, not shown), or both, a metering restriction, e. g., a Venturi tube 18, and a connecting pipe 19. Gas is supplied under pressure from any suitable source by a gas conduit that includes a gas inlet 20, optionally a gas shut-off valve 21, a gas metering valve 22, a metering restriction, e. g., adjustable throttle or needle valve 23, a connecting pipe 24, and a gas manifold 25. A plurality of gas branches 26 extend from the manifold as tributories to the respective air branches and are in free communication with the air branches at points close to the air intake valves 11, as shown. There is thus a separate air branch and a separate gas branch for each intake valve, these branches being all unrestricted and of ample diameters throughout their lengths so that the pressure drop through the branches is minimal during flow of air and gas, whereby the pressures in the air and gas manifolds are substantially equal at all times. It will be noted that the gas branches communicate with the air branches in close proximity to the respective intake valves, the junction points being preferably spaced upstream from the intake valves by distances not greater than twice the diameter of the air branch. In consequence of the greater volumetric flow of air in relation to the gas flow the air branches are normally made larger than the gas branches, and this makes it advantageous to mount the downstream parts of the latter within the former, terminating coaxially, as shown; this arrangement, while preferred to avoid interference between the currents of air and gas and to insure equality of pressures and good mixing, is optional and other arrangements for combining the air and gas streams near the intake valves may be employed. The part of the air duct between the air manifold and the closest above-mentioned obstruction therein, i. e., downstream from both the flow controller and the restriction, is likewise uniformly of ample diameter. It is preferred to dispose the Venturi constriction tube 18 downstream from the flow controller, for reasons that will appear later. The pipe 24 between the gas manifold and the restriction at 23 is likewise uniformly of ample diameter.

The gas metering valve 22 is mounted in a valve housing 27 that provides a valve seat and carries a differential pressure-responsive actuator 28. Referring first to a diagrammatic view in Figure 1, it will be seen that the actuator comprises a housing including outer rigid walls 29 and 30, a rigid cylindrical part 31 connecting the said outer walls, and a rigid partition wall 32 through which extends an axially slidable coupling rod 33 connected at the ends thereof to the central portions of flexible diaphragms 34 and 35 that are sealed at the margins to the cylindrical part of the housing, the parts inward of the margins being constrained by the rod to move in unison. These diaphragms may have equal areas, as shown, although other relations may in some cases be employed. It will be noted that the wall 32 and the diaphragms 34 and 35 divide the housing into four chambers LA, LG, HG, and HA, respectively, adapted to contain low pressure air, low pressure gas, high pressure gas and high pressure air, respectively, each chamber being bounded in part by a movable wall. The rod 33 is connected to one end of a lever 36 having a pivoted mounting at 37 on the valve housing 27 and further pivotally connected to the metering valve 22, so as to move the latter toward open position (downward) when the rod 33 moves up, the stated directions having reference to Figure 1 only. The valve housing 27 contain a balancing diaphragm 38 dividing the housing into an inner (lower) space 39 containing the valve and an outer (upper) space 40; the balancing diaphragm is connected for movement with the valve member. The chamber HG is in communication with the outer space 40 through a passageway 41 formed in the housing and with the discharge side of the metering valve 22 by a passageway 42; the latter is thereby in communication with the part of the gas conduit immediately upstream of the metering restriction 23. The chamber LG is in communication with the part of the gas conduit immediately down-stream of the metering restriction through a passageway or duct 43. The two other chambers are connected to axially displaced points in the air duct at desired locations in the vicinity of the restriction therein such as to generate a differential pressure that increases with the rate of air flow. Thus, the chamber HA may be connected by a passageway or duct 44 to a plurality of circumferentially spaced openings 45 slightly upstream of the throat in the Venturi section 18, and the chamber LA may be connected by a passageway or duct 46 to a plurality of openings 47 in the Venturi throat.

Figure 4:
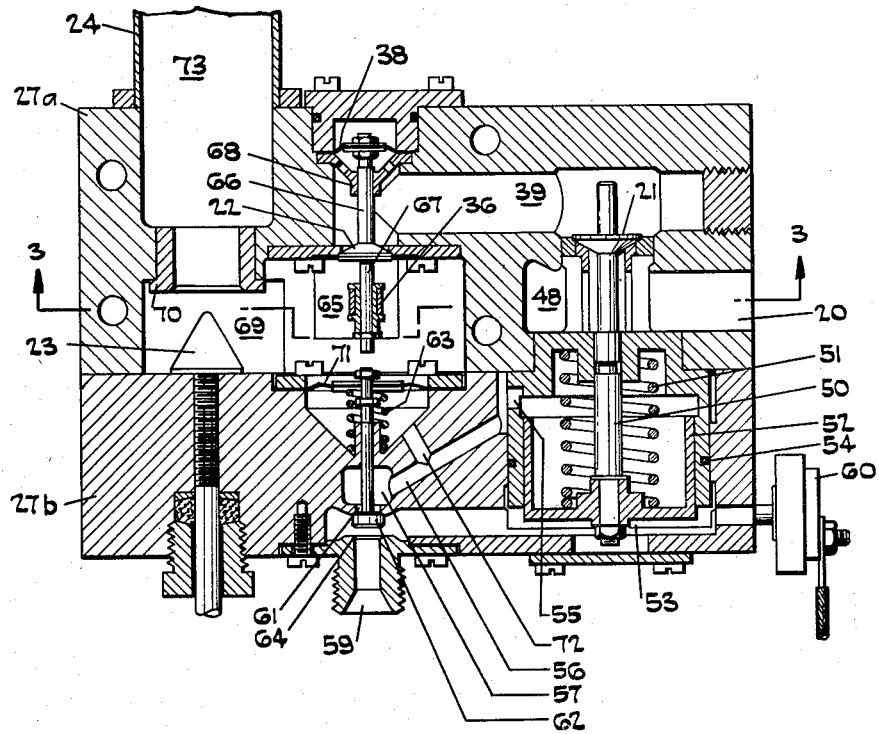
Figure 4 is a section view taken on a vertical section plane indicated at 4—4 in Figure 3 but on an enlarged scale.
Figure 5:
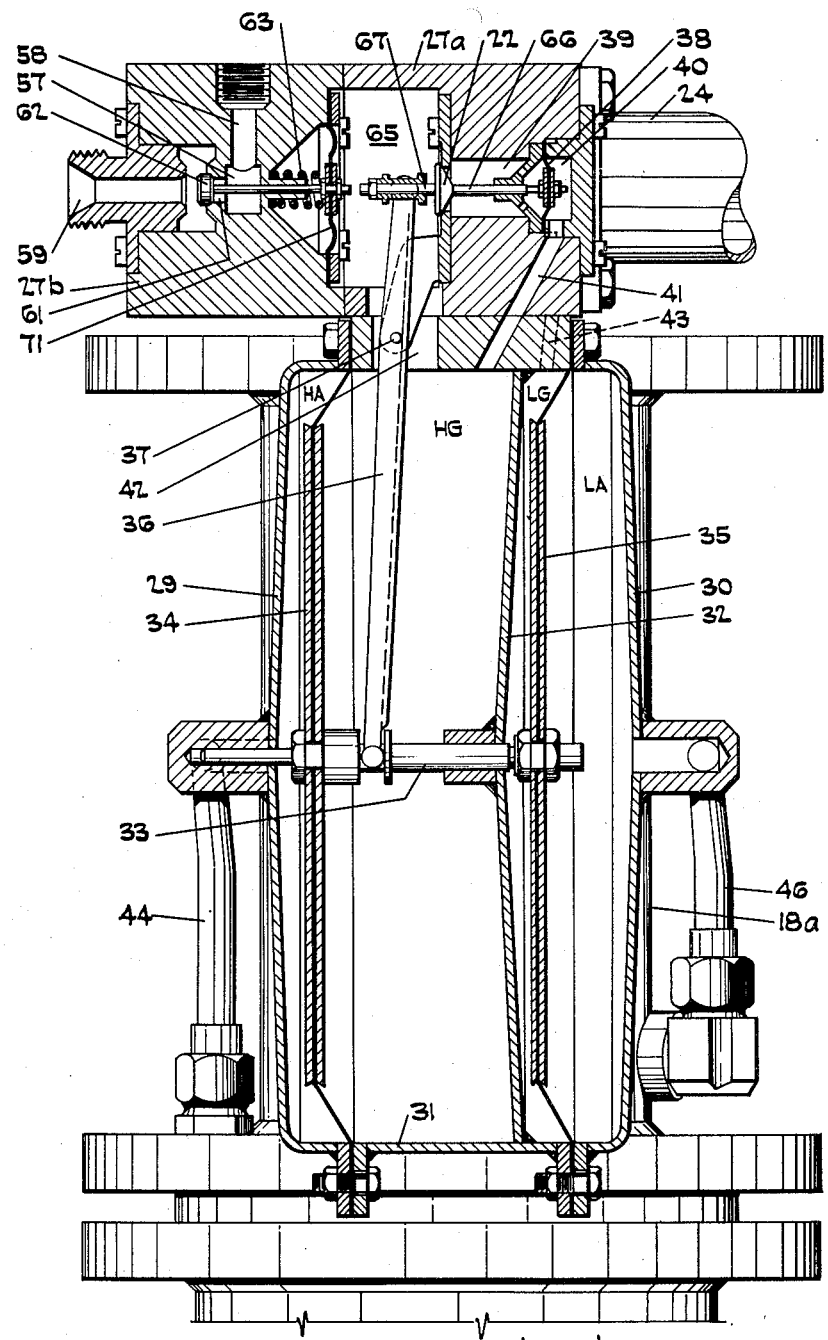
Figure 5 is a section view taken on a vertical section plane indicated at 5—5 on Figure 3, also on an enlarged scale.

A specific construction for the valve arrangements and valve actuator described above is shown in Figures 3–5, wherein the valve housing is formed in two parts 27a and 27b. Reference numbers in these views indicate parts corresponding to those previously described for Figure 1. The housing section 27a has an opening 20 (Figure 4) adapted to be connected to the source of fuel gas under pressure and communicating with a chamber 48 that is separated from a chamber 39 by the biased, normally closed shut-off valve 21 having a stem 50 by which it is urged to closed position by a spring 51. The latter bears on a piston 52 that is connected to the valve stem and has the lower, outer face exposed to pressure within a liquid pressure chamber 53. The piston is slidable within a seal cup 54 having ports 55 by which the inside of the piston is vented to a communicating passage 56 and vent chamber 57, of which the latter is continually in communication through outlet 58 (Figure 5) with a low pressure point, e. g., the sump of the engine crankcase, whereby a liquid leaking past the piston or vented as described below may be discharged. The chamber 53 may be supplied with oil under pressure from an inlet 59; this is adapted for connection to the lubricating system of the engine, whereby pressure will be applied to the piston 52 to open the shut-off valve 21 only after the oil pressure has been built up by cranking the engine. A hydraulic pressure-actuated switch 60 may further be connected to the housing so as to expose a pressure-sensitive wall thereof to liquid within the chamber 53, whereby the ignition system will be operative only when pressure has been built up within the chamber. Inlet 59 and vent chamber 57 are in communication through a passageway 61 that is normally closed by a spring biased, double seated safety valve 62 that is urged by a spring 63 to the normal position shown, in which the inlet 59 communicates only with the chamber 53. The safety valve, when pushed downwards (as seen in Figure 4) engages a valve seat 64 to interrupt the supply of liquid from the inlet 59 and to place the chamber 53 into communication with the vent chamber 57 and outlet 58 through the passageway 61; this permits the piston 52 to descend and the shut-off valve 21 to close.

The gas metering valve 22 is seen to separate the chambers 39 and 65 and to have opposed, coaxial valve stems 66 and 67, of which the former is slidably mounted in an open guide 68 and connected to the balancing diaphragm 38; the latter stem is pivotally connected by flanges to the bifurcated rounded end of the lever 36, which is pivoted on a pin at 37. The outer space 40 behind the balancing diaphragm communicates with the chamber HG of the actuator through passageway 41, this chamber being also in communication with the chamber 65 through passageway 42, which also accommodates the lever 36. The chamber 65 is in free communication with an adjoining chamber 69 containing an adjustable conical valve 23 that cooperates with a seat 70 to constitute the metering restriction. A safety diaphragm 71 forms one wall of the chamber 65 and is connected to the stem of the safety valve 62; the space on the valve side of the diaphragm 71 communicates with the passage 56 through a passage 72.

The chamber LG of the actuator communicates through a passageway 43 to the chamber 73 which is on the downstream side of the metering restriction and leads to the gas conduit 24. The chamber HA communicates with the openings 45 at the upstream side of the Venturi tube 18 through passageway including duct 44 and the chamber LA communicates with the openings 47 by passageway including duct 46.

*Operation*

When the lubricating oil pressure in the engine, admitted through inlet 59 to chamber 53, is sufficient to open the valve 21 fuel gas flows from the inlet opening 20 successively through the chambers 48, 39, 65, 69 and 73 to the gas conduit 24 and manifold 25 at a rate determined by the position of the metering valve 22. This valve is connected to the lever 36 in such a way that when the differential between the pressures in the chambers HG and LG equals the differential between the pressures in the chambers HA and LA, the valve is stationary. The former differential is that between the chambers 65 and 73 and will be adjusted in any desired relation to the rate of gas flow by the adjustable valve 23; the latter is determined by the flow of air through the Venturi throat section 18. Hence, adjustment of the valve 23 will alter the gas-air ratio at which the valve 22 is in equilibrium. If the position of the throttle valve 16 in the air duct is altered somewhat in order to modify the engine output, for example, like closing it slightly, the differential between the air pressures will decrease somewhat owing to the reduced air velocity in the air duct causing the diaphragms to move downwards (directions as in Figure 1) so that the valve 22 moves partially toward closed position. Because of this, the differential between the gas pressure falls slightly as a result of the diminishing rate of gas flow thereby inducing an upward movement of the diaphragms. A new state of equilibrium will thus be established, with the valve 22 ultimately in a more closed position than at first, whereby the differentials between the air and gas pressures again have equal values, so that the air to gas ratio also has the required constant value.

The principle on which the device operates is as follows: If a gas is caused to flow through a tube with a restricted metering passage, for example, through a Venturi tube, metering restriction or metering nozzle, the differential between the gas pressures at two axially displaced points, e. g., ahead of and within a Venturi throat, is proportional to the density and to the square of the linear velocity of the gas, according to the formula:

$$p' - p'' = c.\gamma.v^2 \qquad (1)$$

in which:

$p'$ = the pressure of the gas ahead of the Venturi tube
$p''$ = the pressure of the gas inside the Venturi tube
$c$ = a proportionality constant
$\gamma$ = the density of the gas, and
$v$ = the gas velocity The weight of gas which flows through the tube per unit of time is proportional to the density and velocity of the gas:

$$G = c'.v.A.\gamma \qquad (2)$$

Here, G=the weight of gas per unit of time or mass flow rate, $v$=the velocity of the gas, A=the area of the section of the tube through which the gas flows (usually at the throat), $\gamma$= the density of the gas and $c'$ is a proportionality constant.

For effective metering the metering restrictions in the air and gas ducts should have similar characteristics, so that the constants $c$ and $c'$ both remain constant (although not necessarily equal) with different rates of flow, or at least vary proportionally with flow. It may be observed that the constant $c$ is essentially constant for a Venturi and that the constant $c'$ for the passage between the conical valve 23 and its seat is reasonably constant, so that these metering restrictions are of the same type.

Elimination of the gas velocity $v$ from the two equations gives the mass flow rate as a function of the differential of the two gas pressures at axially displaced points in the vicinity of the Venturi tube, the local cross sectional area, and the local density of the gas as follows:

$$G = A.c' \sqrt{\frac{(p'-p'').\gamma}{c}} \quad (3)$$

Since the density is directly proportional to the gas pressure at the point concerned, the formula can be written as follows when the constant terms are summarized on a new constant proportional factor C:

$$G = C.A\sqrt{p(p'-p'')} \quad (4)$$

This equation can be applied successively to the air flow and to the flow of gaseous fuel in view of the similarity of the characteristics of the metering restrictions. The ratio K of the weight of air $G_a$ to the weight rate of gaseous fuel $G_g$ can, according to the above equation, be expressed as follows:

$$K = \frac{G_a}{G_g} = C' \frac{A_a}{A_g} \sqrt{\frac{p_a(p_a'-p_a'')}{p_g(p_g'-p_g'')}} \quad (5)$$

in which $C'$ is a constant, the index $a$ refers to the air, and the index $g$ of the fuel gas.

If it is desired to establish a constant ratio between the quantitites of gas and air fed to the engine per unit of time, this can be done by insuring that the ratio of the pressure differentials of air and gas over the respective metering restrictions, that is $$\frac{p'_a - p''_a}{p'_g - p''_g}$$

is kept constant and at the same time the ratio of the pressures, viz., $$\frac{p_a}{p_g}$$

on which the density depends, is kept constant, for example equal to unity as in the embodiment illustrated.

By employing smooth mixing, without orifices, the pressures in the air and gas lines immediately upstream from the junction point near the engine intake valve are equal. By providing lines of ample diameters throughout, only negligly small pressure drops occur during flow of air and gas, so that the pressures immediately downstream from the metering restrictions are substantially equal. Further, since the differentials of the pressures over the restrictions are likewise equal because of the operation of the actuator previously described, the pressures of the air immediately upstream of the Venturi constriction and in the chamber 65 immediately upstream of the metering restriction 23 will also be substantially equal.

It is also evident from Equation 5 that for gas of the same composition, adjustment of the air-gas ratio depends exclusively on the ratio of the cross sectional areas of the two constrictions, that is to say, on the quotient $A_a/A_g$. Hence, by making one of these constrictions variable, e. g., by the throttle valve 23, the mixture strength of the gas-air mixture supplied to the engine can be adjusted. If gas with a different molecular weight or density under standard conditions is used, the proportionality constant will, of course, be altered, and the setting of the needle valve 23 must be readjusted.

It is also evident from the foregoing equations that by the arrangement according to the invention the tendency of the mixture strength to vary due to variations in the density of the gas due to pressure changes—a problem not encountered when working with liquid fuels—is obviated. By taking off the differential air pressures behind, i. e., downstream of, the air flow controller, and making the air pressure at this point substantially equal to that in the corresponding point in the gas conduit, the ratio of air and gas pressures and, hence, of densities at the points of measurements remains constant under different pressure conditions. It may be noted that in this regard the illustrated arrangement differs from that usually employed in carburation systems for liquid fuel, in which it is essential that the constriction for bringing about the differential pressure in the air current should be situated ahead of the throttle, for as the density of the liquid fuel is almost constant under different pressures, it is necessary there to choose a place of constant pressure in the air line in order to obtain a constant density ratio.

As regards the disposition of the gas metering valve 22 and the metering restriction 23 in relation to each other, it should be noted that in view of the change in the density of the gas upon passing the metering valve, special measures have to be taken here, too. Thus, a further characteristic of the regulating device is that the metering restriction is situated behind the gas metering valve, for the pressure of the gas at the restriction must correspond to the pressure of the air at the restriction in the air duct. This requirement makes it necessary to select a point for the restriction in the gas conduit where the gas pressure is almost equal to the air pressure and this is the case behind the gas metering valve, that is to say, a point in the gas conduit which is situated downstream from the gas metering valve. It may be noted that in the case of liquid fuel systems this selection of the point of restriction in relation to the metering valve is of no importance, in view of the essentially constant density of the liquid that makes it independent of pressure; hence, it does not matter whether the restriction in a liquid flow line is placed ahead of or behind the regulating valve.

It should be noted that, while the system described can be used in conjunction with a pressure regulating valve, the use of such a valve is not necessary because the metering valve 22 operates to perform this function. Thus, in view of the ample sizes of the conduits downstream from the restrictions, the pressure at the discharge of the metering valve remains substantially equal to the air pressure at the corresponding point for all flow rates encountered. If, for any reason, the gas supply pressure increases, a minor, temporary pressure rise in the chamber 65 at the downstream side of the metering valve increases the pressure in the chamber HG, thereby causing the metering valve to move toward closed position to restrict the flow of gas and bring the gas pressure within the chamber 65 back to the proper value. Because the metering valve is balanced by the balancing diaphragm 38, the large diaphragms 34 and 35 perform this corrective action rapidly, so that the amount and pressure at which the gas is supplied to the gas manifold and engine are wholly independent of the gas pressure, and the mass rate of gas flow is proportional to the mass rate of air flow. Hence, the system is suitable for direct connection to a high pressure gas main.

In the case of multi-cylinder engines as illustrated, the flows through the branches are intermittent, occurring only when the respective engine intake valves open, but flow into the air and gas manifolds are not interrupted, but substantially steady but subject to pulsations.

By mixing the gas and air in close proximity to the intake valves only a very small quantity of combustible mixture is present outside of the engine, whereby the danger of explosion in the event of an engine backfire is greatly reduced. Because the pressures in the air and gas manifolds are equal flow ceases in both the air and gas branches when the corresponding intake valve is closed, and only a minor, negligible diffusion between air and gas occurs.

A safety feature of the system yet to be described is the prevention of rupture of the large diaphragms in the actuator due to unduly high pressure differences. As was noted previously, in consequence of the pressure equality, the pressure in the chamber HA is substantially equal to that in chamber HG, while the pressures in chambers LA and LG are also substantially equal, and only small mechanical stresses are placed on the diaphragms. If for any reason the supply pressure becomes unduly large and were to rupture the balancing diaphragm 38, or if the latter should fail for any reason, there would be danger of entry of high pressure gas from the chamber 39, ahead of the metering valve 22, directly through passage 41 into the chamber HG, which could rupture the large diaphragm 34; this diaphragm is more costly and difficult to install than the balancing diaphragm. Such damage to the large diaphragm is prevented by the preferred construction because any such pressure rise would act immediately on the safety diaphragm 71 through the large passage 42; when this pressure rises above a value determined by the spring 63 the double seated safety valve 62 is moved to open the passage 61 and seat on the seat 64. This results in shutting off the supply of oil under pressure to the pressure chamber 53 and the venting of the latter into the vent chambers 57 and outlet 58, permitting the shut-off valve 20 to move to closed position under influence of its spring 51. Reduction of the pressure in the chamber 53 also operates the switch 60 to shut off the ignition to the engine. It is evident that the valve 62 prevents the build-up of an unduly high pressure on the diaphragm 34.

It is evident that if, for any reason, the lubricating oil pressure of the engine falls, the pressure in the chamber 53 will be similarly reduced and the engine will be automatically stopped by operation of the valve 20 and switch 60, as mentioned above. Similarly, when the engine is stopped by means of the ignition circuit, as by operating a control switch, not shown, the resulting fall in the pressure of the lubricating oil results in the closing of the shut-off valve 20.

It is evident that certain changes in the details of the apparatus may be made twithout departing from the spirit of the invention. Thus, the four chambers in the valve actuator need not be arranged in the sequence shown and need not be made equal in size. When the diaphragms are unequal in size, the ratio of the pressure differentials, appearing in Equation 5 would have a value other than unity when the diaphragms are in equilibrium position, resulting in a different value for the constant C' appearing therein.

I claim as my invention:

1. In a charge-forming apparatus for a gas-fuel internal combustion engine having an intake valve, the combination with a source of gas under pressure, of: an air duct for the supply of air to said intake valve including an air flow controller and a metering restriction downstream from said controller; a gas conduit connected between said source of gas and said air duct at a point therein downstream of the said restriction therein, said gas conduit being in free communication at said point with the air duct to feed gas into the air duct and including a gas metering valve and a metering restriction downstream from the gas metering valve; a differential flow-responsive actuator including a pair of diaphragms connected to move in unison and to actuate said metering valve by the movement thereof, said actuator being connected to axially displaced points in the air duct near said metering restriction therein so as to subject two surfaces of said diaphragms to opposed forces produced by the differential between air pressures in the air duct and being further connected to axially displaced points in the gas conduit near said metering restriction therein so as to subject two other surfaces of said diaphragms to opposed forces produced by the differential between gas pressures in the gas duct, the connections being such that the metering valve is moved toward open position upon an increase in the differential between said air pressures corresponding to an increase in the rate of air flow and upon a decrease in the differential between said gas pressures corresponding to a decrease in the rate of gas flow, said air duct and gas conduit being of ample diameter downstream from the said restrictions therein, whereby the lower of said air pressures is substantially equal to the lower of said gas pressures.

2. A charge-forming apparatus according to claim 1 wherein one of said diaphragms is exposed on one surface thereof to the lower of said air pressures and on the other side thereof to the lower of said gas pressures, and the other of said diaphragms is exposed on one surface thereof to the higher of said pressures and on the other side thereof to the higher of said gas pressures, whereby said diaphragms are subjected to only slight mechanical stresses.

3. In apparatus for regulating the flow of gas to internal combustion engines operating on gas and having an air duct, the subcombination of: a gas metering valve adapted to be connected to a source of gas under pressure, said valve being reciprocably mounted within a housing providing a valve seat and divided by a flexible balancing diaphragm connected to said valve for movement therewith into an inner space containing said valve and an outer space; a gas conduit connected to the discharge of said metering valve to conduct gas to said air duct and providing a metering restriction; a differential pressure-responsive actuator for said metering valve including a plurality of movable diaphragms forming partial bounding walls of separate chambers and connected to actuate said metering valve, a first and a second of said chambers being connected to points upstream and downstream, respectively, of said metering restriction for subjecting two surfaces of said diaphragms to opposed forces produced by differential gas pressures at said points, and another pair of chambers being adapted for connection to said air duct to subject a second pair of surfaces to opposed forces produced by differential air pressure that increases with the rate of air flow in said duct; and a passageway connecting the first of said chambers to said space on the outer side of the balancing diaphragm for balancing the forces acting on the balancing diaphragm.

4. In combination with the elements according to claim 3, a normally closed biased shut-off valve connected ahead of said gas metering valve, hydraulic means for opening said shut-off valve including a liquid pressure chamber and a liquid supply duct for supplying liquid under pressure to said chamber; a liquid outlet; biased safety valve means operative in the normal, biased position thereof to place said liquid supply duct into communication with said liquid pressure chamber for opening said shut-off valve and to close free communication from said liquid pressure chamber to said outlet and in another position thereof to interrupt the supply of liquid from the supply duct to the pressure chamber and to connect the latter to the outlet; and means responsive to an increase in the pressure in said first chamber of the differential pressure-responsive actuator for moving said safety valve means to said other position.

References Cited in the file of this patent
UNITED STATES PATENTS 986,754   Podhajsky _____ Mar. 14, 1911

(Other references on following page)

| | UNITED STATES PATENTS | | 2,505,725 | Shepherd | Apr. 25, 1950 |
|---|---|---|---|---|---|
| 1,363,513 | Keith | Dec. 28, 1920 | 2,571,713 | Herbert | Oct. 16, 1951 |
| 1,441,302 | Schneider | Jan. 9, 1923 | | FOREIGN PATENTS | |
| 2,283,021 | Udale | May 12, 1942 | 630,968 | France | Dec. 12, 1927 |
| 2,375,071 | Boyer | May 1, 1945 | 532,572 | Great Britain | Jan. 27, 1941 |
| 2,475,086 | Ensign | July 5, 1949 | | | |